3,250,793
17α-HALOGENATED HYDROCARBON DERIVATIVES OF ESTRA-4,9-DIENE 3β,17-DIOLS
John Fried, Plainfield, N.J., assignor to Merck & Co., Inc., Rahway, N.J., a corporation of New Jersey
No Drawing. Filed June 19, 1963, Ser. No. 288,906
8 Claims. (Cl. 260—397.5)

This invention relates to estra-4,9-dienes. More particularly, it relates to estra-4,9-diene-3β,17-diols, mono- and diesters thereof and 3,5(10),9-triene analogues of the diesters. The compounds of the invention are characterized by the presence of a halogenated hydrocarbon side chain containing a maximum of three carbon atoms at the 17α-position. The invention also includes within its scope processes by which the novel products may be prepared. Compounds of this invention are valuable as orally and parenterally active progestational agents.

Compounds within the scope of this invention may be represented by the formulas:

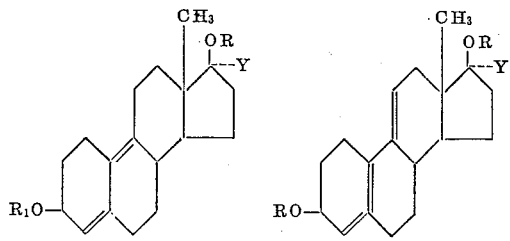

wherein Y is a halogenated hydrocarbon side chain containing from two to three carbon atoms such as trifluorovinyl; trifluoropropynyl; 3',3',3'-trifluoropropenyl or haloethynyl such as chloro- or bromoethynyl; R is hydrogen or an acyl radical for example a lower hydrocarbon carboxylic acyl radical such as benzoyl, acetyl, propionyl, butyryl, caprylyl or the like, and $R_1$ is hydrogen or acyl radical which may be identical with R. It will be noted that the 3,5(10),9-trienes are enol acylates of the corresponding 3-oxo-4,9-dienes.

Starting compounds used in the presently preferred process for preparing the valuable compounds of this invention include those represented by the formula:

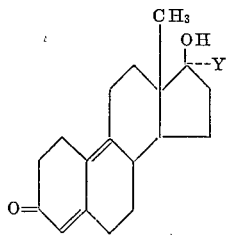

wherein Y has the same meaning as above.

These compounds may be prepared from 3-methoxyestra-2,5(10)-dien-17-one or equivalent alkoxy compound. The 3-methoxy compound has the structural formula:

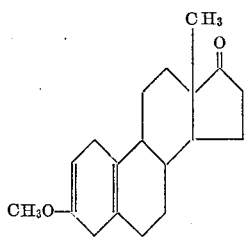

Reaction of a 3-alkoxy-estra-2,5(10)-dien-17-one with a haloethyne forms the corresponding 17α-haloethyne compound. The 3-methoxy compound may be represented by the following formula wherein Z is a haloethyne radical:

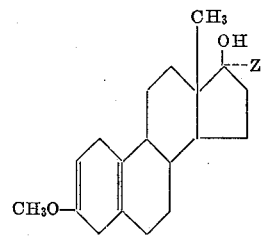

The 3-methoxy-2,5(10)-diene mentioned above may be reacted with trifluorovinyl magnesium bromide to form the 17α-trifluorovinyl derivative. The compound may be represented by the formula:

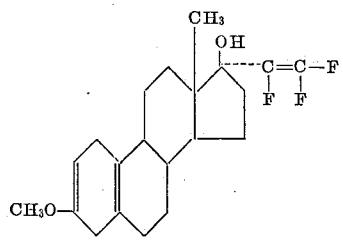

A trifluoropropynyl substituent is introduced at the 17α-position of the 3-alkoxy-2,5(10)-diene by reaction with trifluoropropyne which has been previously treated with ethyl magnesium bromide. The 3-methoxy-17α-trifluoropropynyl compound may be represented by the formula:

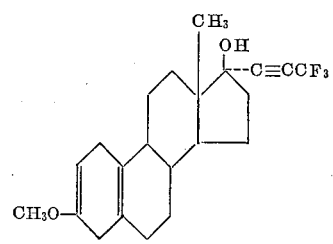

The 3-alkoxy-estra-2,5(10)-dien-17β-ols substituted at the 17α-position with unsaturated halogenated hydrocarbon side chains prepared as described above are next converted to 17β-hydroxy-estra-5(10)-en-3-ones similarly substituted at the 17α-position by reaction with a weak organic acid preferably a lower alkanoic acid such as acetic acid. For example, a mixture of the steroid and glacial acetic acid in an aqueous solution in absolute ethanol and dioxane may be left standing at room temperature for several hours to prepare the desired product.

The 17α-trifluoropropynyl-5(10)-ene thus prepared is reduced to form the 17α-(3',3',3'-trifluoropropenyl) derivative. The reaction may be effected using a noble metal catalyst such as a Lindlar catalyst (lead deactivated palladium or calcium carbonate) at an elevated pressure.

The 17β-hydroxy-estra-5(10)-en-3-ones substituted with a halogenated hydrocarbon side chain containing from two to three carbon atoms at the 17α-position which are prepared by the foregoing series of reactions may be represented by the formula:

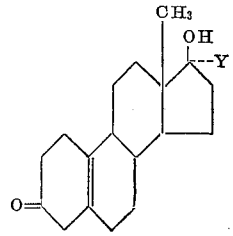

wherein Y has the same meaning as above. These compounds are converted to the above described preferred starting compounds by reaction with approximately one equivalent of bromine in pyridine solution or with a perbromide hydrobromide.

Two basic reactions are utilized to prepare the products of this invention. These are acylation and reduction. The structure of the final product is determined by the order in which the reactions are carried out. The compound 17α-chloroethynyl-estra-4,9-dien-3β,17-diol is prepared by direct reduction of the corresponding 3-oxo compound. This product can be converted to a 3-acyloxy derivative taking advantage of the facile esterification of the 3-hydroxy group.

Direct acylation of 17α-chloroethynyl-17-hydroxy-estra-4,9-dien-3-one affords a mixture of the 17-acylate and the enol acetate of the 3-oxo compound for example 3,17-diacetoxy-17α-chloroethynyl - estra-3,5(10),9-triene. The mixture may be separated chromatographically.

Reduction is effected with a stereospecific reducing agent such as lithium aluminum hydride tri-tertiary butoxide in an inert organic solvent. For example, 17α-trifluorovinyl-estra-4,9-diene-3β,17-diol may be produced by allowing a mixture of the corresponding 3-oxo compound and the reducing agent in tetrahydrofuran to stand for approximately one hour at room temperature. In a preferred modification, the reaction mixture is initially maintained at approximately 0° C. for about 15 minutes and then at room temperature for about one hour. The use of an initial low temperature period is not essential however.

By proper selection of the order of reaction, either 3β- or 17β-monoacylates or if desired, either symmetrical or nonsymmetrical diacylates of the 4,9-dienes of this invention are produced. The preferred procedure for the preparation of diesters is to first acylate the 3-oxo compound, then reduce and finally acylate the reduction product. This procedure produces higher yields of purer product than the alternative procedure. The 3β-monoacylate is produced by esterification of the reduced product, namely the 3β,17β-diol.

It will be noted that the enol esters, i.e. the 3β,17β-diacyloxy-3,5(10),9-trienes are symmetrical diesters.

The alkanoyl esters are prepared by reaction of the selected substrate with the acylating agent, for example an alkanoic acid anhydride or alkanoyl halide in the presence of a tertiary amine such as pyridine. Esterification at the 3β-position can be accomplished more easily than esterification at the 17β-position. Generally, 3-acylation is effected simply by allowing the reactants to stand at room temperature for severel hours or by heating on a steam bath for 10 to 30 minutes. Esterification at the 17β-position is best effected by allowing the reaction mixture to stand on a steam bath for at least five hours.

The compounds of this invention are progestational agents and are useful in the treatment of various human ailments requiring progestation hormone therapy. They may be administered alone or associated with a pharmaceutical carrier, the choice of which will depend upon the properties of the active compound and standard pharmaceutical practice. Generally the compound is administered in dosages of the same order of magnitude as other progestational agents such as norethisterone and dosage units may take the form of tablets, powders, capsules, elixirs or syrups which are particularly useful for oral ingestion. Liquid diluents are employed in sterile condition for parenteral use.

The following examples are given by way of illustration only and are not intended as limitations of this invention many apparent variations of which are possible without departing from the spirit and scope thereof.

Preparation I through VI illustrate the preparation of starting compounds in accordance with the preferred process of this invention.

PREPARATION I.—17α-CHLOROETHYNYL-3-METHOXY-ESTRA-2,5(10)-DIEN-17-OL

A solution of 3.4 grams (2.64 ml.) of cis-1,2-dichloroethylene in 10 ml. of sodium dried over ether is added over one-half hour at 0° C. to 6 ml. of a 1.4 N solution of methyl lithium (prepared by adding lithium to methyl iodide in dried ether solution under nitrogen at about 10° C.) in 50 ml. of sodium dried ether. The reaction mixture under nitrogen is stirred for an additional two hours and 100 mg. of 3-methoxy-estra-2,5(10)-dien-17-one in 10 ml. of sodium dried ether added over a 20 minute period. The mixture is stirred for approximately 15 hours, poured into ice water, filtered and the precipitate extracted with ether. The ether extracts are washed with water, dried over an anhydrous sodium sulfate, filtered and the solvent removed. The residue is chromatographed on basic alumina by charging with petroleum ether and eluting with mixtures of petroleum ether and ether to give the desired product.

The corresponding 17α-bromoethynyl compound is similarly prepared from the same starting material but utilizing 1,2-dibromoethylene in place of 1,2-dichloroethylene.

PREPARATION II.—17α-TRIFLUOROVINYL-3-METHOXY-ESTRA-2,5(10)-DIEN-17-OL

A solution of 1 gram of 3-methoxy-estra-2,5(10)-dien-17-one in 10 ml. of benzene containing an equal amount of ether is prepared by adding the steroid to 15 ml. of benzene, distilling off 5 ml. of solvent, cooling and adding the ether. To this mixture there is added 10 ml. of a tetrahydrofuran solution containing 0.1 ml. of trifluorovinyl magnesium bromide and the mixture is stirred for approximately 16 hours at 20° to 30° C. It is then diluted with water and extracted with ether. The combined extracts are washed with water until the washings are weakly basic, dried over anhydrous sodium sulfate, filtered and the solvent removed. The residue is chromatographed on basic alumina by charging with petroleum ether and eluting with mixtures of petroleum ether and ether to give the desired product.

PREPARATION III.—17α - TRIFLUOROPROPYNYL-3-METHOXY-ESTRA-2,5(10)-DIEN-17-OL

A 50 ml. three-neck round bottom flask is fitted with a Dry Ice condenser, a dropping funnel and a magnetic stirrer. After the addition of 210 mg. of magnesium, the entire system is swept with nitrogen and flame dried. Five ml. of dry ether is added to the magnesium and 1 ml. of ethyl bromide in 5 ml. of ether is added dropwise with stirring over 15 minutes. After all the magnesium has reacted, 5 ml. of trifluoropropyne (prepared by the reaction of propiolic acid with sulfur tetrafluoride) is distilled in and refluxed under Dry Ice-acetone for one hour. The reaction is then allowed to warm to room temperature, the excess gaseous trifluoropropyne being distilled off. A solution of 500 mg. of 3-methoxy-estra-2,5(10)-dien-17-one which is dried by azeotropic distillation from benzene, is added in 5 ml. of benzene and 5 ml. of dry ether. The reaction is stirred for 16 hours at room temperature. Water is then added and the mixture extracted with ether. The organic extracts are washed with water until the washings are weakly basic, dried over sodium sulfate and concentrated in vacuo. The residue is chromatographed on 20 g. basic alumina, by charging with petroleum ether and eluting with a mixture of 8 parts petroleum ether and 2 parts ether to give the desired product.

PREPARATION IV.—17α-TRIFLUOROPROPYNYL-17-HYDROXY-ESTRA-5(10)-EN-3-ONE

To 410 mg. of the compound prepared in Preparation III in 4.1 ml. of dioxane and 18.45 ml. of absolute ethanol is added 8.2 ml. of glacial acetic acid in 4.1 ml. of water. This reaction mixture is left stirring at room temperature for 5 hours. It is then poured into an ice-sodium bicarbonate solution and extracted with benzene. The benzene extract is washed with water until the washings are just slightly basic, dried over sodium sulfate and concentrated in vacuo. The crude product (334 mg.) is chromatographed on 13 g. of neutral (ethyl acetate washed) alumina by charging with a mixture of 1 part benzene and 1 part petroleum ether, and eluting with mixtures of 8 parts petroleum ether:2 parts ether and 7 parts petroleum ether:3 parts ether. Recrystallization from a mixture of ether-petroleum ether affords 167 mg. of the desired product, M.P. 137–140° C.

The following compounds are similarly prepared: 17α-chloroethynyl-17-hydroxy-estra-5(10)-en-3-one; 17α-bromoethynyl-17-hydroxy-estra-5(10)-en-3-one and 17α-trifluorovinyl-17-hydroxy-estra-5(10)-en-3-one.

PREPARATION V.—17α-(3',3',3'-TRIFLUOROPROPENYL)-17-HYDROXY-ESTRA-5(10)-EN-3-ONE

A solution of 100 mg. of the product prepared in the previous preparation and 100 mg. of Lindlar catalyst in 10 ml. of ethyl acetate is treated with hydrogen at 40 pounds per square inch pressure until one molar equivalent of hydrogen is absorbed. The mixture is filtered and concentrated. The desired product is obtained by chromatography of the crude product.

PREPARATION VI.—17α-CHLOROETHYNYL-17-HYROXY-ESTRA-4,9-DIEN-3-ONE

To 100 m. of 17α-chloroethynyl-17-hydroxy-estra-5(10)-en-3-one in 5 ml. of pyridine is added one equivalent of bromine. The reaction is stirred for two hours at room temperature, poured into ice-water and extracted with ether. The ether extract is washed with water, dried over sodium sulfate, and concentrated in vacuo to yield the desired product.

The following compounds are similarly prepared: 17α-bromoethynyl-17-hydroxy-estra-4,9-dien-3-one; 17α-trifluorovinyl-17-hydroxy-estra-4,9-dien-3-one; 17α-trifluoropropynyl-17-hydroxy-estra-4,9-dien-3-one; 17α-(3',3',3'-trifluoropropenyl)-17-hydroxy-estra-4,9-dien-3-one.

*Example I.—3β,17-diacetoxy-17α-chloroethynyl-estra-3,5(10),9-triene*

Three hundred mg. of 17α-chloroethynyl-17-hydroxy-estra-4,9-dien-3-one is dissolved in 10 ml. of 3:2 pyridine and acetic anhydride and heated on a steam bath under nitrogen for 7 hours. The mixture is poured into ice water and extracted with ether. The ether layer is separated and the aqueous layer extracted several more times with ether. The combined ethereal solutions are washed with water and with dilute aqueous sodium bicarbonate and again with water. The organic layer is dried over anhydrous magnesium sulfate, filtered and the solvent removed. The residue is dissolved in benzene, chromatographed on acid washed alumina and eluted with mixtures of petroleum ether-ether. The more polar enol diacetate separates with the early fractions. The less polar 17-acetoxy-17α-chloroethynyl-estra-4,9-dien-3-one separates with the later fractions.

This procedure is utilized to prepare the enol diesters of the products prepared using the procedure of Preparation VI. A variety of diesters are formed including for example the dipropionates, dibutyrates, dicaprylylates and dibenzoates by the procedure of this example at temperatures of from 80° to 100° C. for from 5 to 10 hours. Nitrogen helps to minimize side reactions but is not essential.

*Example II.—17-acetoxy-17α-chloroethynyl-estra-4,9-dien-3β-ol*

A solution of 165 mg. of 17-acetoxy-17a-chloroethynyl-estra-4,9-dien-3-one in 1.5 ml. of dry tetrahydrofuran is added to 500 mg. of lithium aluminum hydride tri-tertiary butoxide in 5 ml. of tetrahydrofuran at approximately 0° C. The mixture is sealed and maintained at 0° C. for 15 minutes. It is then allowed to warm to room temperature and is maintained at room temperature for one hour. At the end of this period, 25 ml. of ether is added and the mixture cooled in ice. The mixture is then poured into water with vigorous agitation. The mixture is filtered, the layers separated and the ethereal solution washed with water until the washings are neutral. The organic layer is dried over anhydrous magnesium sulfate, filtered and the solvent removed to leave the desired product.

Other 17β-acyloxy-3β-hydroxy-estra-4,9-dienes substituted at the 17α-position with a halogenated hydrocarbon side chain are similarly prepared from the corresponding 3-oxo compounds prepared in accordance with the procedure of Preparation VI by mixing the reactants in an inert organic solvent at from 0° to 30° C. and allowing the mixture to stand for from 1 to 5 hours. For example, 17α-chloroethynyl-estra-4,9-diene-3β,17-diol is prepared from 17α-chloroethynyl-17-hydroxy-estra-4,9-dien-3-one as are the following compounds using the appropriate starting compound: 17α-bromoethynyl-estra-4,9-diene-3β,17-diol; 17α-trifluorovinyl-estra-4,9-diene-3β,17-diol; 17α-trifluoropropynyl-estra-4,9-diene-3β,17-diol; 17α-(3',3',3'-trifluoropropenyl)-estra-4,9-diene,3β,17-diol.

*Example III.—3β-acetoxy-17α-chloroethynyl-estra-4,9-dien-17-ol*

One hundred eighty mg. of 17α-chloroethynyl-estra-4,9-diene-3β,17-diol is dissolved in 3.6 ml. of dry pyridine and 2.7 ml. of acetic anhydride added. The solution is heated under nitrogen on a steam bath for 10 minutes and cooled in an ice bath. The solution is evaporated at room temperature in vacuo and the residual gum dissolved in 1 ml. of ethanol containing a few drops of pyridine. This solution is re-evaporated, the residue dissolved in 1 ml. of ethanol and the solution diluted with 25 ml. of ether. The ethereal solution is washed with diluted aqueous sodium bicarbonate and then with water until the washings are neutral. The organic layer is dried over anhydrous magnesium sulfate, filtered and evaporated in vacuo at 60° C. to leave the desired product as a residue.

This procedure is used to prepare a variety of 3β-esters of the 3β,17-diols prepared using the procedure of the previous example. Among the esters prepared are the propionates, butyrates, benzoates, phenyl acetates and caprylylates.

The same procedure is also utilized to prepare symmetrical and nonsymmetrical diesters of the 17β-acyloxy compounds prepared using the procedure of Example II. The following are typical examples of diesters prepared by the procedure:

3β,17-diacetoxy-17α-chloroethynyl-estra-4,9-diene;
3β,17-diacetoxy-17α-bromoethynyl-estra-4,9-diene;
3β,17-diacetoxy-17α-trifluorovinyl-estra-4,9-diene;
3β,17-diacetoxy-17α-trifluoropropynyl-estra-4,9-diene;
3β,17-diacetoxy-17α(3',3',3'-trifluoropropenyl)-estra-4,9-diene;
3β-acetoxy-17-butoxy-17α-chloroethynyl-estra-4,9-diene;
3β-acetoxy-17-butoxy-17α-bromoethynyl-estra-4,9-diene;
3β-acetoxy-17-butoxy-17α-trifluorovinyl-estra-4,9-diene;
3β-acetoxy-17-butoxy-17α-trifluoropropynyl-estra-4,9-diene;
3β-acetoxy-17-butoxy-17α-(3',3',3'-trifluoropropenyl)-estra-4,9-diene;
3β-aceotxy-17-caprylyloxy-17α-chloroethynyl-estra-4,9-diene;
3β-acetoxy-17-caprylyloxy-17α-bromoethynyl-estra-4,9-diene;
3β-acetoxy-17-caprylyloxy-17α-trifluorovinyl-estra-4,9-diene;
3β-acetoxy-17-caprylyloxy-17α-trifluoropropynyl-estra-4,9-diene;
3β-acetoxy-17-caprylyloxy-17α-(3',3',3'-trifluoropropenyl)-estra-4,9-diene.

Various changes and modifications may be made in carrying out the present invention without departing from

I claim:
1. 17-acetoxy-17α-trifluorovinyl-estra-4,9-dien-3β-ol.
2. 3β,17-diacetoxy-17α-trifluorovinyl-estra-4,9-diene.
3. 17-acetoxy-17α-trifluoropropynyl-estra-4,9-dien-3-ol.
4. 3β,17-diacetoxy - 17α - trifluoropropynyl - estra - 4,9-diene.
5. 3β,17-diacetoxy - 17α - (3′,3′,3′ - trifluoropropenyl)-estra-4,9-diene.
6. 3β,17-diacetoxy-17α-trifluorovinyl - estra - 3,5(10),9-triene.
7. 3β,17-diacetoxy - 17α - trifluoropropynyl - estra - 3,5(10),9-triene.
8. 3β,17-diacetoxy - 17α - (3′,3′,3′ - trifluoropropenyl)-estra-3,5(10),9-triene.

References Cited by the Examiner

UNITED STATES PATENTS

| | | | |
|---|---|---|---|
| 3,086,027 | 4/1963 | Perelman et al. | 260—397.3 |
| 3,126,399 | 3/1964 | Sollman | 260—397.4 |

OTHER REFERENCES

Fried et al.: JACS, vol. 83 (1961), page 4663 relied on.
Lowenthal: "Tetrahedron" (1959), vol. 6, No. 4, pages 282–283 relied on.

LEWIS GOTTS, *Primary Examiner.*
ELBERT L. ROBERTS, *Assistant Examiner.*